(12) United States Patent
Lee

(10) Patent No.: US 11,832,705 B2
(45) Date of Patent: Dec. 5, 2023

(54) COSMETIC CONTAINER

(71) Applicant: SAMHWA CO., LTD, Uiwang-si (KR)

(72) Inventor: Kyungchang Lee, Uiwang-si (KR)

(73) Assignee: SAMHWA CO., LTD, Uiwang-si (KR)

( * ) Notice: Subject to any disclaimer, the term of this patent is extended or adjusted under 35 U.S.C. 154(b) by 0 days.

(21) Appl. No.: 17/834,851

(22) Filed: Jun. 7, 2022

(65) Prior Publication Data

US 2023/0148733 A1 May 18, 2023

(30) Foreign Application Priority Data

Nov. 16, 2021 (KR) .......................... 10-2021-0157582

(51) Int. Cl.
*A45D 34/04* (2006.01)
*G01F 11/02* (2006.01)

(52) U.S. Cl.
CPC ............ *A45D 34/04* (2013.01); *G01F 11/023* (2013.01); *G01F 11/028* (2013.01); *A45D 2200/055* (2013.01); *A45D 2200/10* (2013.01)

(58) Field of Classification Search
CPC .............. A45D 34/04; A45D 2200/055; A45D 2200/10; G01F 11/028; G01F 11/023; B05B 11/1005; B05B 11/1007; B05B 11/1008

See application file for complete search history.

(56) References Cited

U.S. PATENT DOCUMENTS

| 2001/0027983 A1* | 10/2001 | Stadelhofer ......... B05B 11/1026 222/434 |
| 2012/0193376 A1* | 8/2012 | Evans ................... B05B 11/048 222/207 |
| 2014/0054317 A1* | 2/2014 | Brugger ............... B65D 83/525 222/144.5 |

* cited by examiner

*Primary Examiner* — Donnell A Long
(74) *Attorney, Agent, or Firm* — Park, Kim & Suh, LLC

(57) ABSTRACT

The invention relates to a cosmetic container capable of adjusting the amount of content dispensed. A cosmetic container according to one aspect of the invention comprises: an outer container that holds a content; a handle that is rotatably coupled to an upper portion of the outer container; an adjustment member that is coupled to an upper portion of the handle to rotate as an integrated body with the handle and is provided with a downwardly protruding pressure protrusion; and a pump that is configured to suction and dispense the content held in the outer container and is configured such that a pressing on a portion thereof by the pressure protrusion changes an amount of content dispensed, where rotating the adjustment member adjusts a discharging amount of the pump by adjusting the extent to which the pressure protrusion presses the pump.

12 Claims, 14 Drawing Sheets

COSMETIC CONTAINER

CROSS-REFERENCE TO RELATED APPLICATIONS

This application claims the benefit of Korean Patent Application No. 10-2021-0157582, filed with the Korean Intellectual Property Office on Nov. 16, 2021, the disclosure of which is incorporated herein by reference in its entirety.

BACKGROUND

1. Technical Field

The invention relates to a cosmetic container capable of adjusting the amount of content dispensed.

2. Description of the Related Art

A container for a liquid or gel type content (such as a cosmetic, shampoo, detergent, etc.) is generally used with a pump, corresponding to a discharging device, coupled to an upper part of the container. When a user presses down on an upper portion of the pump, the change in pressure and the opening of a valve within the pump allows the content to be dispensed through the pump to the outside. A pump such as described above provides the advantage of greater hygiene, as the content is not exposed to the outside and is thus prevented from spoiling.

The conventional pump, however, entails the problem that the amount of content dispensed is not consistent, as the amount varies according to the extent to which the pump is pressed down. That is, a greater downward force applied on the pump would cause the valve, etc., to move a greater distance and result in a larger amount of dispensing, whereas a smaller downward force applied on the pump would cause the valve, etc., to move a shorter distance and result in a smaller amount of dispensing. Thus, with the conventional pump, the user is unable to accurately adjust the amount of content dispensed.

Also known is a container that stores two types of contents separately within a single container and mixes the contents together at the time of use. This form of mixing container is mainly used in cases where a mixture of the two different types of contents provides a synergetic effect but where a premature mixing of the two different contents before the time of use causes the contents to spoil or exhibit a lowered performance after a prolonged period of distribution.

With this type of mixing container also, providing a constant mixing ratio between the two types of contents can maximize the effect of the mixing. Thus, with this type of mixing container also, there is a need for a function of adjusting the amounts of contents dispensed.

SUMMARY OF THE INVENTION

An aspect of the invention, which was conceived to resolve the problems described above, is to provide a cosmetic container capable of adjusting the amount of content dispensed.

Other objectives of the invention will be more clearly understood from the embodiments set forth below.

A cosmetic container according to one aspect of the invention comprises: an outer container that holds a content; a handle that is rotatably coupled to an upper portion of the outer container; an adjustment member that is coupled to an upper portion of the handle to rotate as an integrated body with the handle and is provided with a downwardly protruding pressure protrusion; and a pump that is configured to suction and dispense the content held in the outer container and is configured such that a pressing on a portion thereof by the pressure protrusion changes an amount of content dispensed, where rotating the adjustment member adjusts a discharging amount of the pump by adjusting the extent to which the pressure protrusion presses the pump.

A cosmetic container according to an embodiment of the invention can include one or more of the following features. For example, the adjustment member can be provided with a guide hole through which the pump can move, and the pressure protrusion can be formed continuously at a lower portion of an inner perimeter of the guide hole.

Two guide holes can be formed symmetrically to each other, and the pressure protrusion can be formed with left-right symmetry.

The guide hole can intersect a line passing through the center of rotation of the adjustment member at two points, and the pressure protrusion can have the same length at the two points.

The pressure protrusion can be formed with the greatest length at one end of the guide hole, while the pressure protrusion may not be formed at the other end of the guide hole.

A shoulder can be coupled to an upper portion of the outer container, the handle can be rotatably coupled to an upper portion of the shoulder, a nozzle can be coupled to an upper portion of the adjustment member, and the nozzle can be connected with the pump to provide a channel for dispensing the content.

The pump can be provided with a pressing flange and a valve flange, the valve flange can be configured to be downwardly pressed by the pressure protrusion, and the valve flange can be configured to be caught on a guide top surface of the adjustment member.

Shoulder detent indentations can be formed in an outer perimeter of the shoulder, an indicator protrusion can be formed on an inner perimeter of the handle and configured to be insertable into the shoulder detent indentations, and the shoulder detent indentations can be formed in a multiple number to indicate the discharging amount of the pump.

The cosmetic container can include an inner container separably coupled within the outer container, where the content can be filled in the inside of the inner container, and an opening of the inner container can be connected to the pump when the inner container is coupled to the outer container.

A deep tube holder can be coupled to the inner container, and the pump can be inserted into the deep tube holder.

A partition wall can be formed within the outer container, and a multiple number of inner containers can be coupled within interior spaces divided by the partition wall.

Two pumps can be coupled to the outer container, and rotating the adjustment member can increase the dispensing amount of one pump while decreasing the dispensing amount of the other pump.

An embodiment of the invention having the features above can provide various advantageous effects including the following. However, an embodiment of the invention may not necessarily exhibit all of the effects below.

An embodiment of the invention can provide a cosmetic container with which the amount of content dispensed can be readily adjusted.

An embodiment of the invention can also provide a cosmetic container with which the content can be readily refilled.

DETAILED DESCRIPTION OF THE INVENTION

Figure 1:
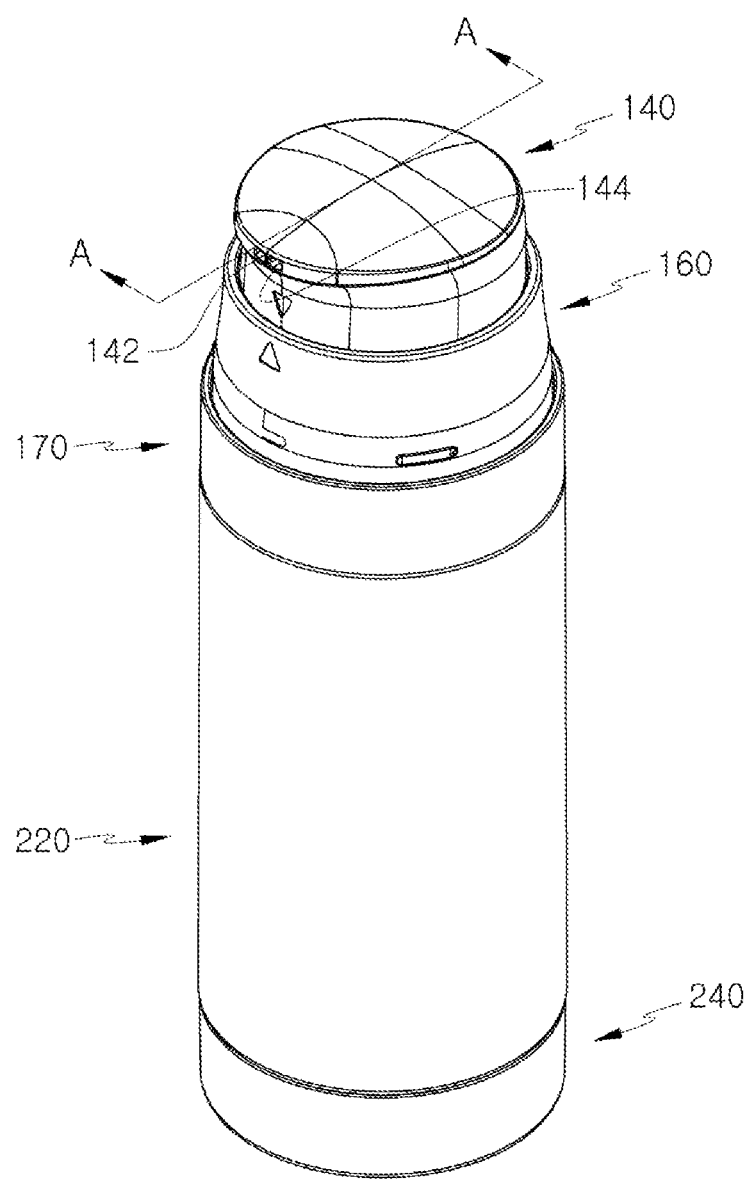
FIG. 1 is a perspective view of a cosmetic container according to an embodiment of the invention.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed by the present invention. In the description of the invention, certain detailed explanations of the related art are omitted if it is deemed that they may unnecessarily obscure the essence of the invention.

The terms used in the present specification are merely used to describe particular embodiments and are not intended to limit the invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

While such terms as "first" and "second," etc., can be used to describe various components, such components are not to be limited by the above terms. The above terms are used only to distinguish one component from another.

Certain embodiments of the invention will be described below in more detail with reference to the accompanying drawings. Those components that are the same or are in correspondence are rendered the same reference numeral, and redundant descriptions are omitted.

Figure 2:
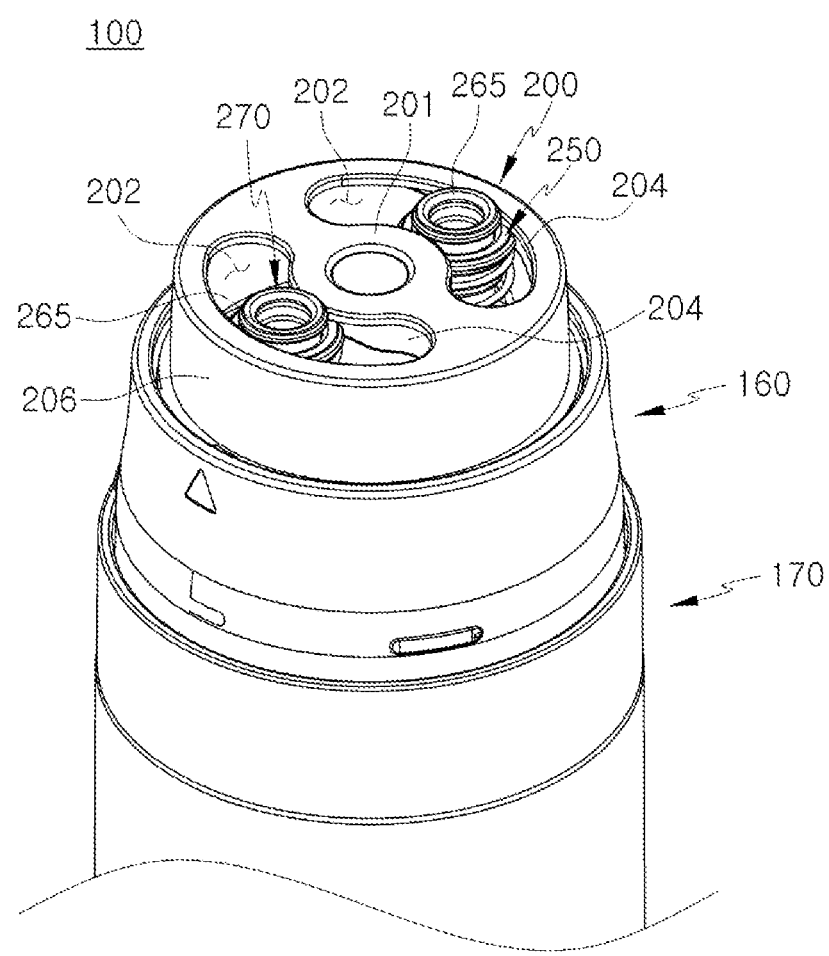
FIG. 2 is a perspective view of the cosmetic container in FIG. 1 with the nozzle removed.
Figure 3:
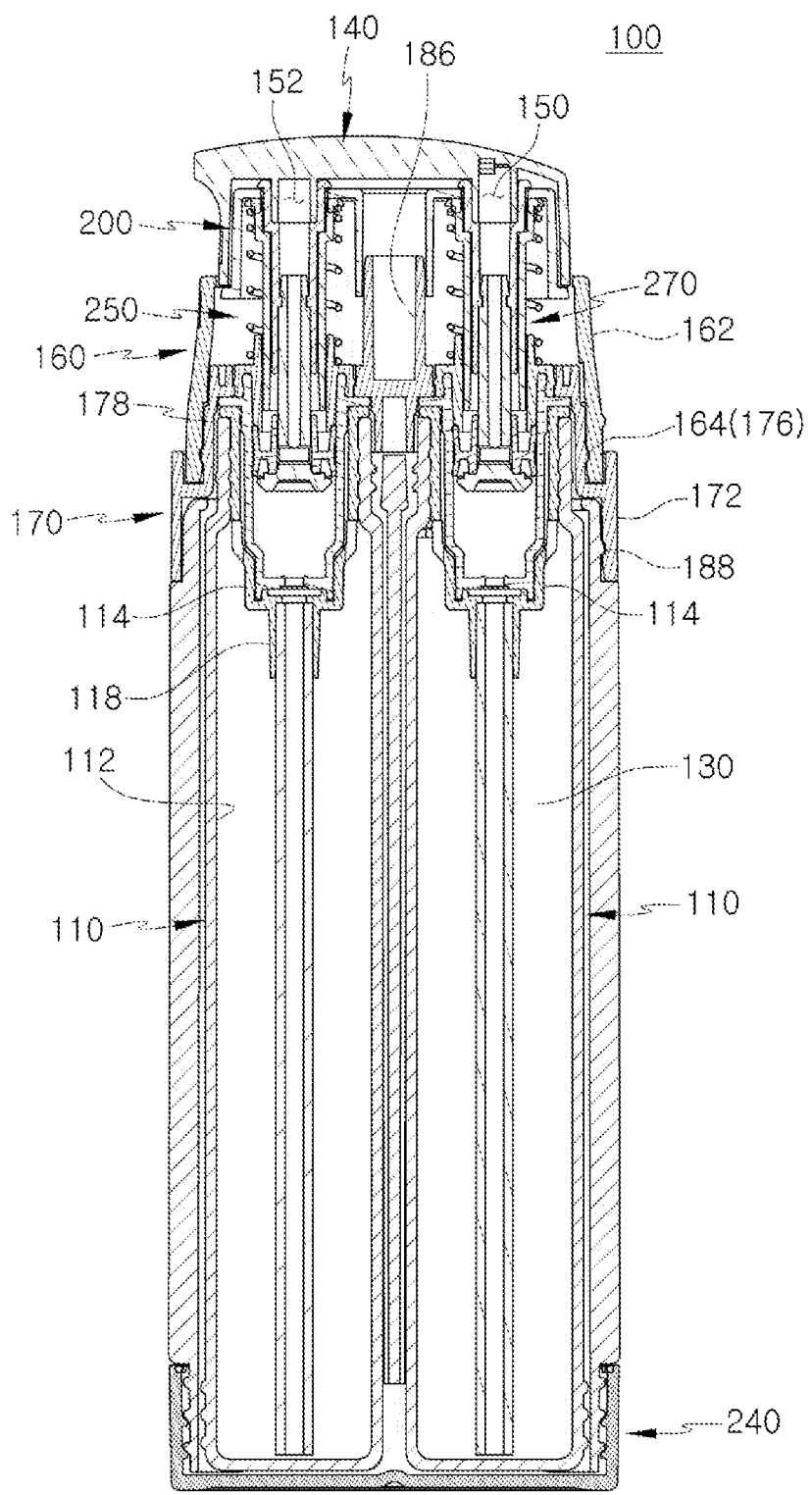
FIG. 3 is a cross-sectional view of the cosmetic container in FIG. 1 across line AA.
Figure 4:
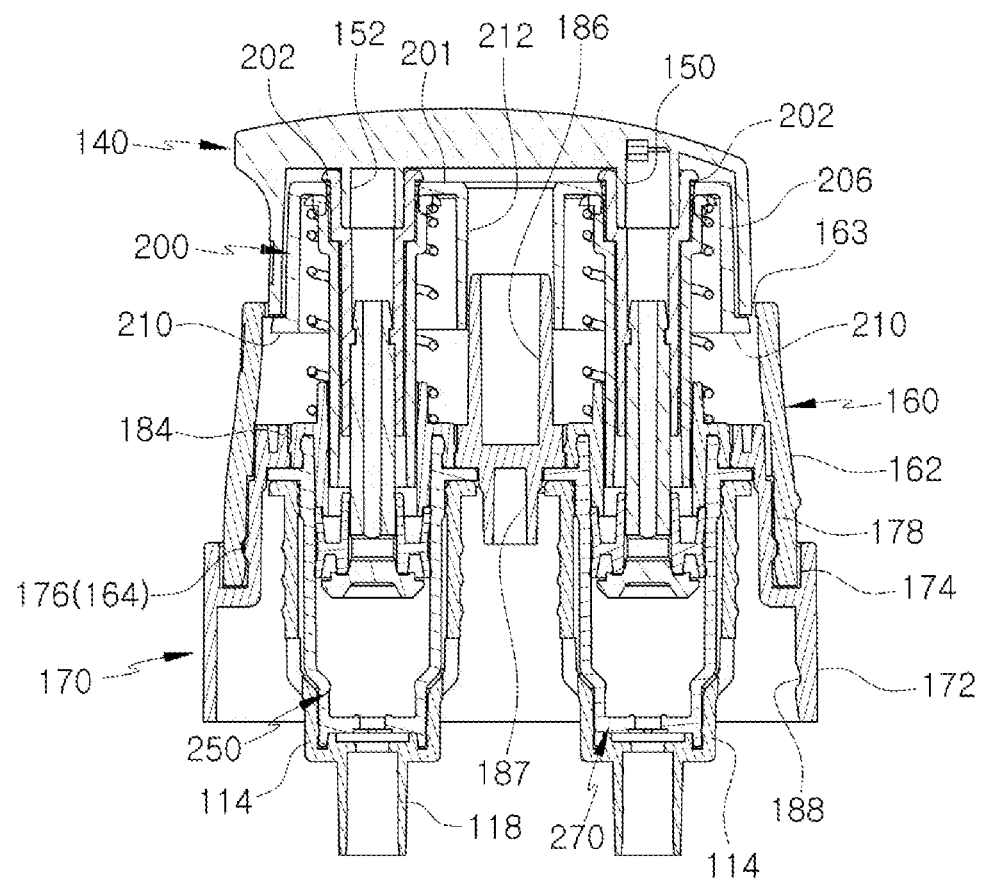
FIG. 4 is a cross-sectional view of an upper part of the cosmetic container in FIG. 3.

FIG. 1 is a perspective view of a cosmetic container 100 according to an embodiment of the invention, and FIG. 2 is a perspective view of the cosmetic container 100 in FIG. 1 with the nozzle 140 removed. FIG. 3 is a cross-sectional view of the cosmetic container 100 in FIG. 1 across line AA, and FIG. 4 is a cross-sectional view of an upper part of the cosmetic container 100 in FIG. 3.

Referring to FIGS. 1 to 4, a cosmetic container 100 based on this embodiment may include two pumps 250, 270 for pumping and discharging two different types of contents and may be configured such that turning a handle 160 provided at an upper part of the container allows a relative adjustment of the discharging amounts of the pumps 250, 270. Incidentally, FIG. 2 illustrates a configuration that allows the two pumps 250, 270 to discharge equal amounts.

A cosmetic container 100 based on this embodiment may be used with replacements of the inner container 110 filled with a content. A cosmetic container 100 based on this embodiment is illustrated using an example that includes two inner containers 110, where each inner container 110 can be filled with a different type of content. When the content filled in an inner container 110 is used up, the user can remove the existing inner container 110 and easily couple a new inner container (filled with a content) for use.

A cosmetic container 100 based on this embodiment may include two inner containers 110, a nozzle 140, a handle 160, a shoulder 170, an adjustment member 200, an outer container 220, a base 240, and two pumps 250, 270. A cosmetic container 100 based on an embodiment of the invention can further include an overcap (not shown) that covers an upper portion of the nozzle 140.

Figure 5:
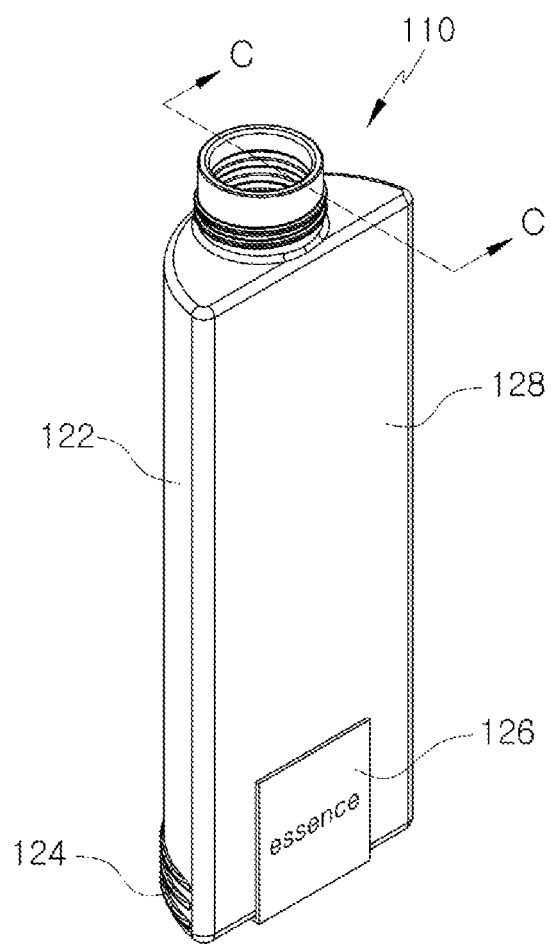
FIG. 5 is a perspective view of the inner container.
Figure 6:
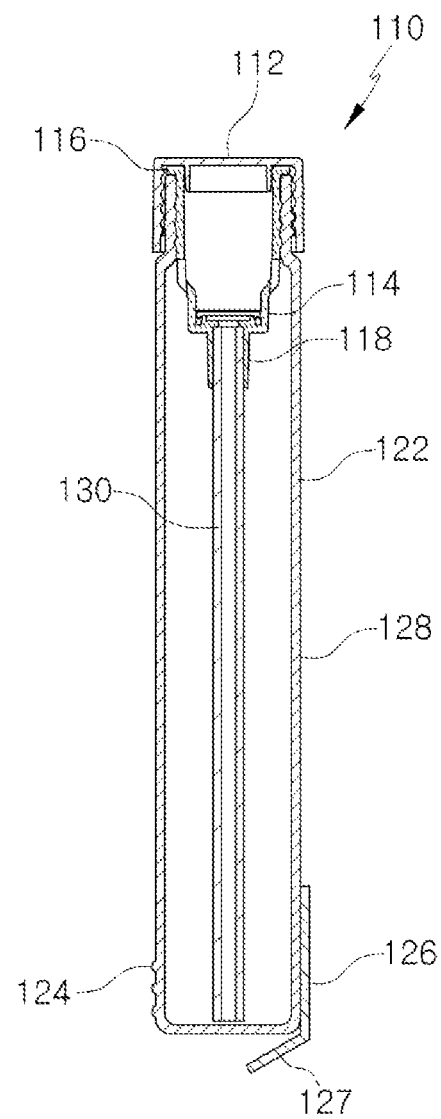
FIG. 6 is a cross-sectional view of the inner container in FIG. 5 across line CC.

FIG. 5 is a perspective view of the inner container 110, and FIG. 6 is a cross-sectional view of the inner container 110 in FIG. 5 across line CC.

Referring to FIGS. 3 to 6, a cosmetic container 100 based on this embodiment may include two inner containers 110 that can be filled with different types of contents. The contents filled in the inner containers 110 can be separately discharged by the pumps 250, 270 and mixed together subsequently. The two inner containers 110 can have the same shape and can be arranged symmetrically to each other.

The inner container 110 may include a container body 122 that is filled with a content. The container body 122 may have a semicircular horizontal cross section such that a flat face 128 is formed on the exterior. The two inner containers 110 may be arranged such that the faces 128 are opposite each other. Also, a coupling thread 124 may be formed at a lower portion of the inner container 110.

A label 126 can be adhered to the face 128, where the label 126 can be a detachably attached film and can indicate the type or amount, etc., of the content filled in the inner container 110. The label 126 can be provided with a downwardly protruding tag 127, to allow the user to easily separate the inner container 110 from the outer container 220 by pulling on the tag 127.

On the inside of the inner container 110, there may be provided a deep tube holder 114 and a deep tube 130.

The deep tube holder 114 may be coupled to the inside through an opening of the inner container 110. The deep tube holder 114 may have a structure similar to that of the housing 252 of the pump 250, 270 and may have the housing 252 inserted therein. The deep tube holder 114 may be provided with an outwardly protruding flange 116 at the upper end, and the flange 116 may be caught on the upper end of the inner container 110.

The deep tube holder 114 may be provided with a downwardly protruding connector protrusion 118. The deep tube 130 may be inserted into the connector protrusion 118. As the connector protrusion 118 connects with the pump 250, 270 and the deep tube 130, a content that is drawn through the deep tube 130 can be made to enter the pump 250, 270.

The deep tube 130 may be a hollow tube and may correspond to a channel through which the content suctioned by the pump 250, 270 may move. The deep tube 130 can be arranged such that the lower end is adjacent to the bottom surface of the inner container 110.

A cap 112 can be coupled to the upper opening of the container body 122. The cap 112 may serve to prevent the content from leaking out and prevent any outside substances from leaking in. The cap 112 can be removed before the coupling to the outer container 220.

Figure 7:
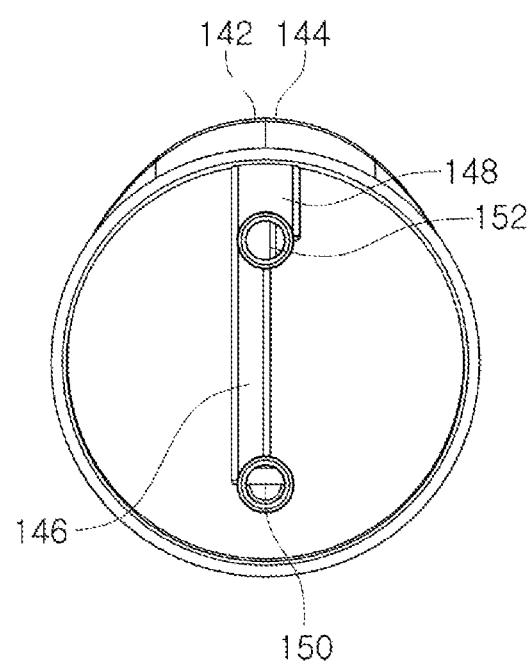
FIG. 7 is a bottom view of the nozzle.

FIG. 7 is a bottom view of the nozzle 140.

Referring to FIGS. 1, 4, and 7, the nozzle 140 may be the part that is pressed down by the user and may include discharge holes 142, 144 through which the two types of contents are discharged. The two types of contents can be discharged, without mixing, through the two discharge holes 142, 144 provided in the nozzle 140, to be mixed together for use by the user.

In the outer perimeter of the nozzle 140, a first discharge hole 142 and a second discharge hole 144, corresponding to channels for discharging the contents to the outside, may be provided adjacently to each other. The first discharge hole 142 and second discharge hole 144 may connect with a first channel 146 and a second channel 148 provided within the nozzle 140. Also, the first channel 146 and second channel 148 may connect with a first protrusion 150 and second protrusion 152 that protrude downwards. The first protrusion 150 and second protrusion 152 may be inserted into the valves 264 of the pumps 250, 270 by way of press fitting. As a result, the nozzle 140 and the valves 264 of the pumps 250, 270 may move down and up together as an integrated body.

When the nozzle 140 is pressed down, the contents held in the inner containers 110 may be suctioned through the pumps 250, 270 and subsequently discharged independently through the first and second protrusions 150, 152, the first and second channels 146, 148, and the first and second discharge holes 142, 144. When the external force is removed, the nozzle 140 may be moved back up to its original position by the elastic restoring forces of the springs 266 of the pumps 250, 270.

Figure 8:
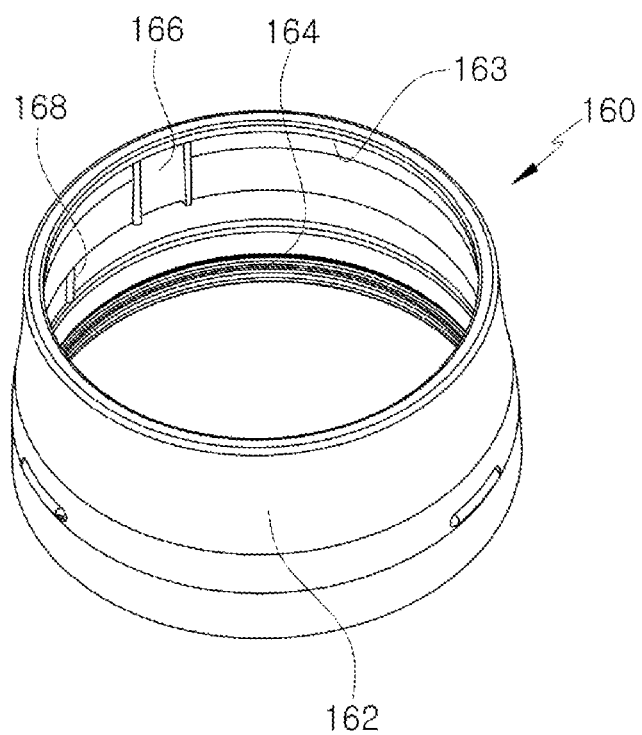
FIG. 8 and FIG. 9 are a perspective view and a cross-sectional view, respectively, of the handle.
Figure 9:
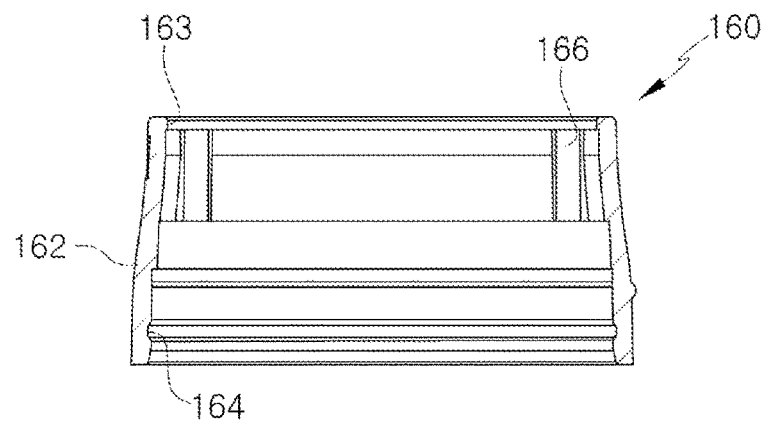

FIG. 8 and FIG. 9 are a perspective view and a cross-sectional view, respectively, of the handle 160.

Referring to FIGS. 1 to 4 and FIGS. 8 and 9, the handle 160 may be located at a lower portion of the nozzle 140 and may be exposed to the exterior, corresponding to the part that is gripped and rotated by the user. When the handle 160 is rotated, the adjustment member 200 may be rotated together, and the amounts of contents discharged from the two pumps 250, 270 can be adjusted relatively.

The handle 160 can be a hollow tube of a particular length and can be structured such that the top and bottom are both open. The handle may have an outer perimeter 162 that is exposed to the exterior. An overcap, not shown, can be coupled onto the periphery of the outer perimeter 162. An inwardly protruding upper curb 163 can be formed on the upper end of the outer perimeter 162. The upper curb 163 may be the part where the lower end of the nozzle 140 is caught, whereby the nozzle 140 may not be separated from the handle 160.

A handle detent indentation 166 may be provided in the inner perimeter of the handle 160. Multiple handle detent indentations 166 can be provided in certain intervals. Adjustment protrusions 210 formed on the lower end of the adjustment member 200 may be inserted into the handle detent indentation 166, whereby the handle 160 and the adjustment member 200 may rotate together as an integrated body. A handle 160 based on this embodiment can have three handle detent indentations 166 arranged in intervals of 120 degrees.

On the inner perimeter of the handle 160, below the handle detent indentations 166, there can be formed an indicator protrusion 168. The indicator protrusion 168 may be caught on the shoulder detent indentations 180 formed on the outer perimeter of the shoulder 170, allowing the user to perceive that the handle 160 was rotated by a particular angle. A shoulder 170 based on this embodiment can include three shoulder detent indentations 180, where the shoulder detent indentations 180 can be arranged to correspond to three positions of the handle 160 (fully rotated in the clockwise direction, fully rotated in the counterclockwise direction, and middle position).

On the inner perimeter of the handle 160, below the indicator protrusions 168, there may be formed a rotary groove 164. A detent protrusion 176 formed on the inside of an insertion groove 174 of the shoulder 170 may be inserted into the rotary groove 164, whereby the handle 160 may be rotatably coupled to an upper portion of the shoulder 170.

Figure 10:
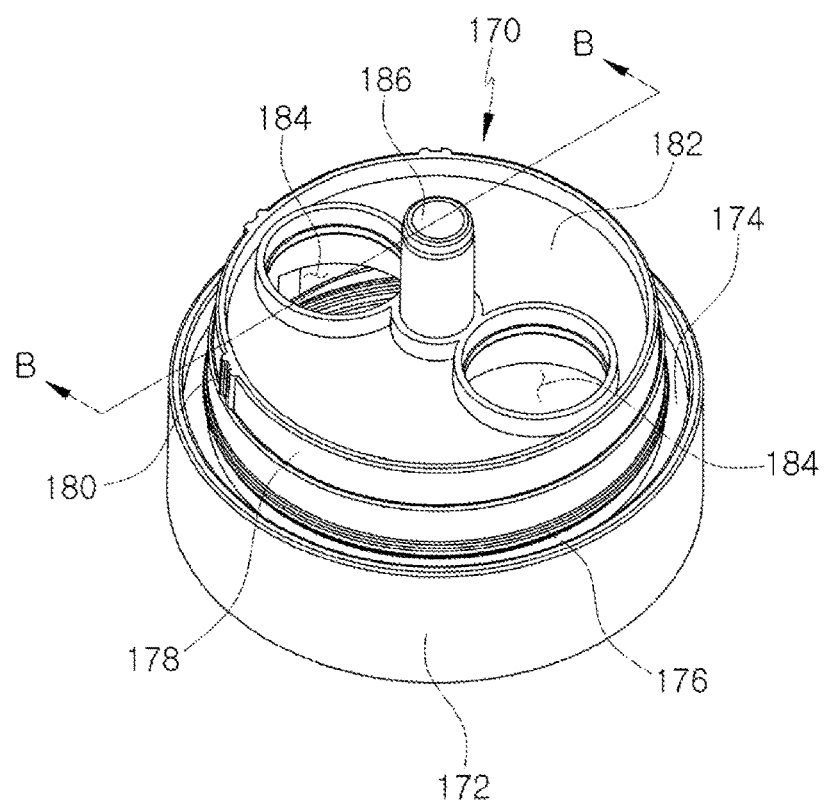
FIG. 10 is a perspective view of the shoulder.
Figure 11:
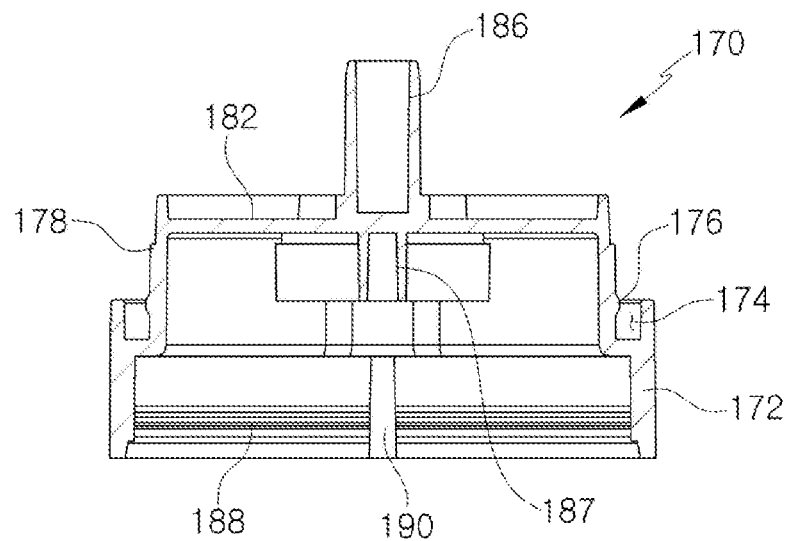
FIG. 11 is a cross-sectional view of the shoulder in FIG. 10 across line BB.

FIG. 10 is a perspective view of the shoulder 10, and FIG. 11 is a cross-sectional view of the shoulder 10 in FIG. 10 across line BB.

Referring to FIGS. 3 to 4 and FIGS. 10 to 11, the shoulder 170 may be coupled to an upper portion of the outer container 220 and may rotatably support the handle 160 coupled to an upper portion the shoulder 170. The shoulder 170 may be shaped as a cap having a shoulder upper surface 182 and may include a lower periphery element 172 and an upper periphery element 178. Two pump holes 184, through which the pumps 250, 270 may be inserted, may be formed in the shoulder upper surface 182, and a center protrusion 186 may be formed in the center of the shoulder upper surface 182.

The lower periphery element 172 may be the part that is inserted onto the periphery of a shoulder coupling element 222 formed on an upper portion of the outer container 220 and may have a diameter greater than that of the upper periphery element 178. On the inner perimeter of the lower periphery element 172, there may be formed a body coupler groove 188. Shoulder coupler protrusions 224 formed on the outer perimeter on an upper portion of the outer container 220 may be inserted into the body coupler groove 188, whereby the shoulder 170 may be coupled to the upper portion of the outer container 220. On the inner perimeter of the lower periphery element 172, anti-rotation protrusions 190 can be formed in a vertical direction. The anti-rotation protrusions 190 may be inserted into anti-rotation indentations 226 formed in the outer perimeter of the upper portion of the outer container 220, whereby the shoulder 170 may be coupled to the upper portion of the outer container 220 in a nonrotatable manner.

An insertion groove 174 may be formed at the connecting portion between the lower periphery element 172 and the upper periphery element 178. The detent protrusion 176 may be formed within the circularly shaped insertion groove 174. The detent protrusion 176 may be inserted into the rotary groove 164 formed in the inner perimeter of the handle 160, whereby the handle 160 may be rotatably coupled to the shoulder 170.

The upper periphery element 178 may be the part that is rotatably coupled with the handle 160. On the outer perimeter of the upper periphery element 178, there can be formed a multiple number of (e.g., three) shoulder detent indentations 180. The indicator protrusion 168 formed on the handle 160 can be inserted into the shoulder detent indentations 180, allowing the user to perceive that the handle 160 is at a particular position or was rotated by a particular angle.

The shoulder 170 may be provided with a shoulder upper surface 182 formed on an upper portion of the upper periphery element 178. The shoulder upper surface 182 may be a horizontal plate and may have a center protrusion 186 protruding upward from the center. The center protrusion 186 can be separably inserted into a coupling protrusion 212 protruding downward from the inside of the adjustment member 200. The pump holes 184 may each be formed on either side of the center protrusion 186 in the shoulder upper surface 182. The pump holes 184 may be formed to penetrate through the shoulder upper surface 182 and may have the same diameter. The pumps 250, 270 may be inserted through the respective pump holes 184.

Figure 12:
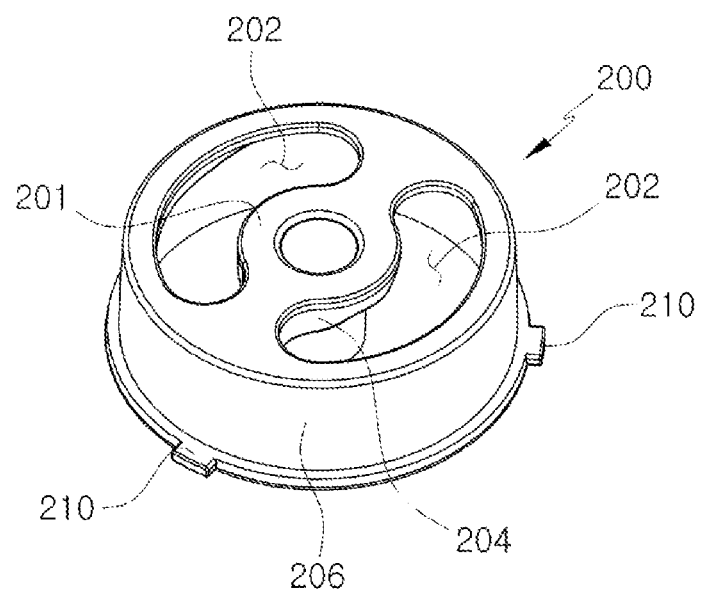
FIG. 12 and FIG. 13 are a perspective view and a bottom view, respectively, of the adjustment member.
Figure 13:
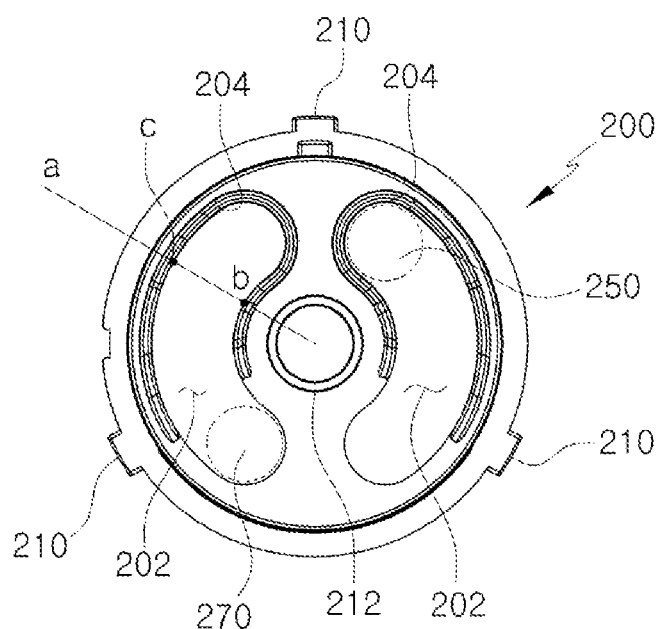

FIG. 12 and FIG. 13 are a perspective view and a bottom view, respectively, of the adjustment member 200.

Referring to FIGS. 2 to 4 and FIGS. 12 to 13, the adjustment member 200 may be coupled to an upper portion of the handle 160 to rotate together with the handle 160 as an integrated body and may serve to adjust the amounts of contents discharged by the two pumps 250, 270. The adjustment member 200 may be shaped as a cap having an open bottom, may have two guide holes 202 formed in the upper surface, and may be provided with a periphery element 206 having a particular height.

The guide holes 202 may be formed symmetrically about the center in the upper surface of the adjustment member 200 and may have arc-like shapes. A pressure protrusion 204 having a varying length may protrude downward from certain portions of the inner perimeters of the guide holes 202. Also, as shown in FIG. 13, the pressure protrusion 204 may not be formed at other portions of the inner perimeters of the guide holes 202.

The length of the pressure protrusion 204 can increase linearly at portions closer to the end of the guide hole 202. Thus, in FIG. 13, the pressure protrusion 204 is not formed at all at one end of the guide holes 202 (where the pump 270 (marked in dotted lines) is located) but is formed the longest at the other end of the guide holes 202 (where the pump 250 (marked in dotted lines) is located).

At the inner perimeters of the guide holes 202, the pressure protrusion 204 at two points b and c that lie on a line a that passes through the center of rotation (i.e., the center of the upper surface) of the adjustment member 200 can have the same length. Thus, the valve guide 262 of a pump 250, 270 that moves along the inner perimeter of a guide hole 202 can be downwardly pressed by the portions of the pressure protrusion 204 having the same length at the two points (i.e., b and c in FIG. 13).

The pressure protrusion 204 may press down on the valve guides 262 of the pumps 250, 270. Therefore, depending on the position of the pumps 250, 270 within the guide holes 202, the distances by which the valve guides 262 are moved down by the pressure protrusion 204 can be different. For example, in FIG. 13, the pump 250 is located at a portion where the pressure protrusion 204 is formed the longest, so that its valve guide 262 would be pressed by the pressure protrusion 204 and positioned at the lowest height. Conversely, the pump 270 is located at a portion where the pressure protrusion 204 is not formed, so that its valve guide 262 would not be pressed and would be positioned at the greatest height.

Thus, before the pumps 250, 270 are pressed down by the nozzle 140, the heights of the valve guides 262 of the pumps 250, 270 may be adjusted beforehand by the rotation of the adjustment member 200 (i.e., the rotation of the handle 160 by the user), so that the amounts of the contents discharged by the two pumps 250, 270 when pressed by the nozzle 140 may be adjusted. That is, the pump 270 of which the valve guide 262 is at the greatest height can discharge the greatest amount of content when pressed down by the nozzle 140, and conversely, the pump 250 of which the valve guide 262 is at the lowest height can discharge the smallest amount of content when pressed down by the nozzle.

As a valve guide 262 is moved from one end of the guide hole 202 where the pressure protrusion 204 is not formed to the other end where the pressure protrusion 204 is formed the longest, the amount of downward movement by the valve guide 262 can be increased linearly. At the same time, the amount of upward movement by the valve guide 262 of the other pump can also be increased linearly. Thus, when the two pumps 250, 270 are located at the centers of the guide holes 202 as in FIG. 2, the heights of the valve guides 262 can be the same, whereby the amounts of contents discharged by the two pumps 250, 270 can also be the same.

From the state shown in FIG. 13, the positions of the pumps 250, 270 can be reversed by rotating the adjustment member 200 in a counterclockwise direction, upon which the pump 250 can discharge the greatest amount of content, and the pump 270 can discharge the smallest amount of content.

The valve guides 262 can be positioned at the centers of the two guide holes 202 simultaneously (as shown in FIG. 2), in which case the pumps 250, 270 can both discharge the same amounts of contents.

Thus, with a cosmetic container 100 based on this embodiment, the user can readily determine the amounts of contents discharged by the pumps 250, 270 by turning the handle 160 to adjust the positions of the valve guides 262 of the pumps 250, 270 within the guide holes 202.

The adjustment member 200 may be provided with a periphery element 206 having a certain height. Also, adjustment protrusions 210 may protrude outward from the lower end of the periphery element 206. The adjustment protrusions 210 may be inserted into the handle detent indentations 166 formed in the inner perimeter of the handle 160, whereby the handle 160 and the adjustment member 200 may rotate together as an integrated body.

In the center of the inner side of the adjustment member 200, there may be a coupling protrusion 212 protruding downward. The coupling protrusion 212 may have the shape of a hollow cylinder and may receive the center protrusion 186 of the shoulder 170 when it is separably inserted therein.

Figure 14:
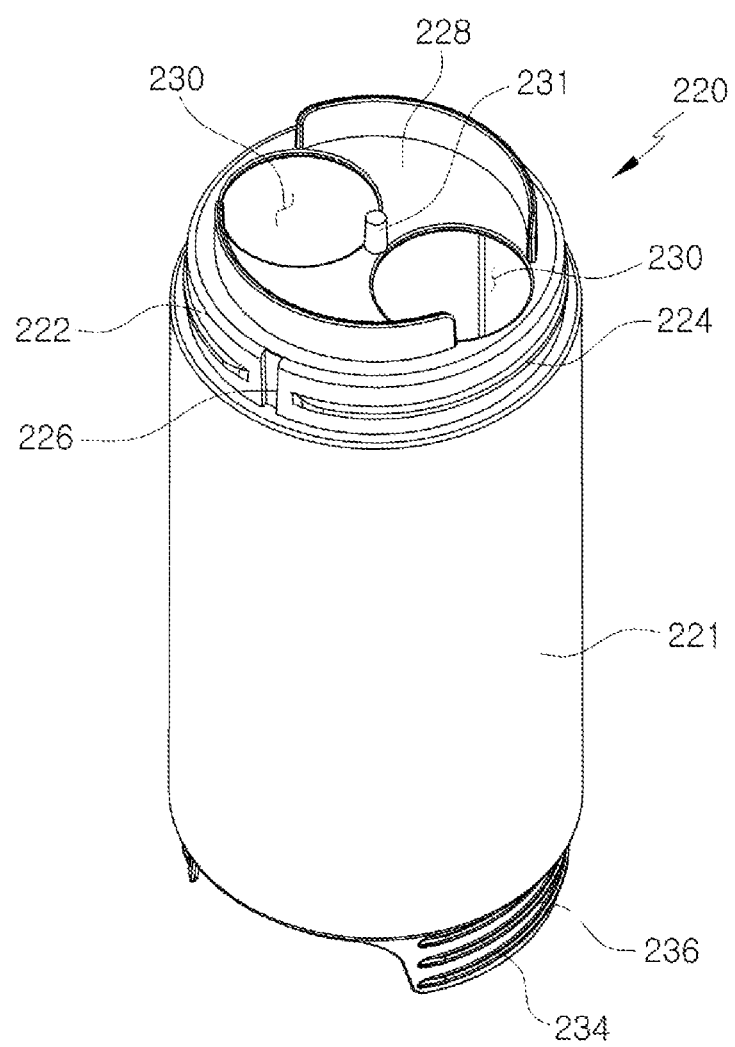
FIG. 14 and FIG. 15 are a perspective view and a cross-sectional view, respectively, of the outer container.
Figure 15:
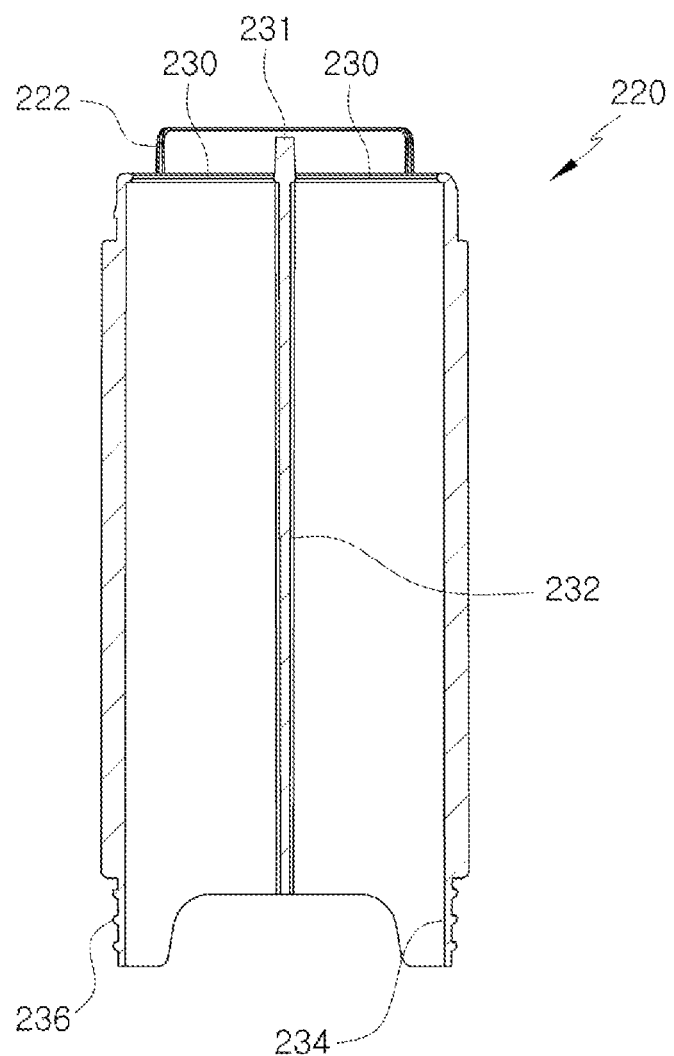

FIG. 14 and FIG. 15 are a perspective view and a cross-sectional view, respectively, of the outer container 220.

Referring to FIGS. 2 to 3 and FIGS. 14 to 15, the outer container 220 may form the exterior of the cosmetic container 100 and may receive a multiple number of inner containers 110, which may be separably coupled therein. The outer container 220 may have the shoulder 170 coupled to an upper portion thereof and the base 240 coupled to a lower portion thereof.

The outer container 220 may have the shape of a hollow cylinder with a placement surface 228 formed at the top and an open bottom. Two container holes 230 may be formed in the placement surface 228. The upper portions of the inner containers 110 may pass through the container holes 230 to be positioned protruding above the outer container 220, and the pumps 250, 270 may be inserted into the protruding inner containers 110. Thus, the container holes 230 formed in the placement surface 228 can be positioned on the same plane as the pump holes 184 formed in the shoulder upper surface 182, to be connected with a particular gap in-between in the vertical direction.

From the center of the placement surface 228, between the two container holes 230, a coupling protrusion 231 may protrude upward. The coupling protrusion 231 can be inserted into a center indentation 187 formed on the inside of the shoulder 170, whereby the shoulder 170 can be coupled to the upper portion of the outer container 220.

On the outer perimeter of the upper portion of the outer container 220, there may be formed a shoulder coupling element 222. The shoulder coupling element 222 may be divided from the outer perimeter 221 of the outer container 220 by a step (no numeral assigned). The shoulder coupler protrusions 224 may be formed protruding outward from the shoulder coupling element 222. Also, the anti-rotation indentations 226 may be formed in a vertical direction in the shoulder coupling element 222. The anti-rotation indentations 226 may be positioned in-between the shoulder coupler protrusions 224.

The shoulder coupler protrusions 224 may be inserted into the body coupler groove 188 formed in the inner perimeter of the shoulder 170, whereby the shoulder 170 may be coupled to the upper portion of the outer container 220. Also, the anti-rotation protrusions 190 formed in the inner perimeter of the shoulder 170 may be inserted into the anti-rotation indentations 226, whereby the shoulder 170 coupled to the upper portion of the outer container 220 may be prevented from rotating.

On the inside of the outer container 220, a partition wall 232 may be formed that divides the interior space in two. The inner containers 110 can be separably coupled to the respective interior spaces divided by the partition wall 232.

On the outer perimeter of a lower portion of the outer container 220, there may be formed a base coupling element 234. The base coupling element 234 may be divided from the outer perimeter 221 of the outer container 220 by a step (no numeral assigned). Two base coupling elements 234, each having an arced shape, can be arranged opposite each other with a particular gap in-between. Thus, the inner containers 110 inserted within the outer container 220 can have their lower ends exposed to the outside, allowing the user to easily grip the inner containers 110. Threads 236 may be formed on the base coupling elements 234, and the base 240 can be fastened to the lower portion of the outer container 220 by way of the threads 236.

The base 240 may be a cap that covers the lower end of the outer container 220 and may serve to cover the inner containers 110 exposed to the outside and prevent the inner containers 110 from becoming detached.

Figure 16:
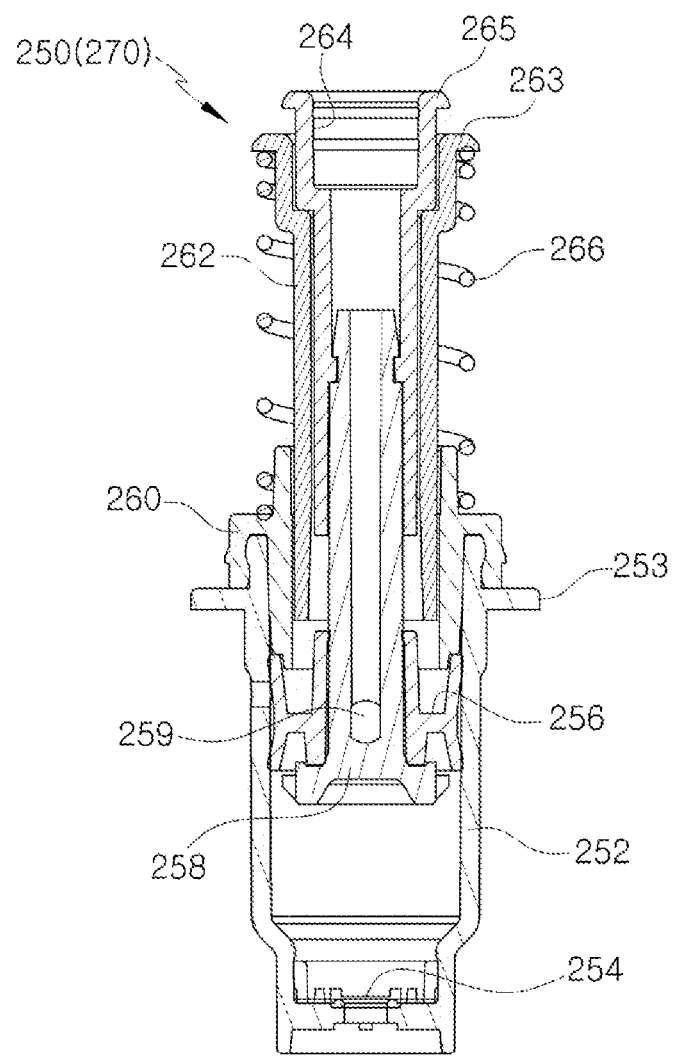
FIG. 16 is a cross-sectional view of the pump.

FIG. 16 is a cross-sectional view of a pump 250, 270.

Referring to FIGS. 2, 3 and 16, a cosmetic container 100 based on this embodiment may be provided with two inner containers 110 and thus may be provided with two pumps 250, 270 correspondingly. The two pumps 250, 270 can have the same structure and can be coupled to the upper portions of the respective inner containers 110 to independently discharge different contents. The discharging amounts of the pumps 250, 270 can be adjusted, as the upper portions of their valve guides 262 are pressed by the pressure protrusion 204 of the adjustment member 200.

As the two pumps 250, 270 may have the same composition, the following provides a description for just one pump 250.

The pump 250 may include a housing 252. When an inner container 110 is coupled to the outer container 220, the housing 252 may be inserted into the deep tube holder 114 coupled to an upper portion of the inner container 110. The bottom surface of the housing 252 can be placed in tight contact with the bottom surface of the deep tube holder 114 such as to be capable of suctioning the content. Inside the housing 252, a disk 254, piston 256, guide 258, valve guide 262, and valve 264 may be positioned such as to be moveable along the up-down direction.

On the outer perimeter on an upper portion of the housing 252, an outwardly protruding housing flange 253 may be formed. The housing flange 253 may rest on the upper surface of the flange 116 of the deep tube holder 114, whereby the pump 250 may be positioned on the upper portion of the deep tube holder 114.

The disk 254 positioned inside the housing 252 may be positioned on the channel (no numeral assigned) through which the content is suctioned and to be opened or closed according to the pressure within the housing 252. That is, when the nozzle 140 is pressed down so that the guide 258, valve 264, and valve guide 262 are moved down, the disk 254 may be closed (the inside of the housing 252 is at a higher pressure compared to the inner container 110). When the external force on the nozzle 140 is removed so that the guide 258, valve 264, and valve guide 262 are moved up by the elastic restoring force of the spring 266, the disk 254 may be opened (the inside of the housing 252 is at a lower pressure compared to the inner container 110).

Since the disk 254 corresponds to known technology, as disclosed in Korean Registered Patent No. 1975847, the disk 254 will not be described here in further detail.

Also, since he composition and operation of the piston 256, guide 258, valve guide 262, and valve 264 located inside the housing 252 are the same as or similar to those set forth in the prior art noted above, they will not be described here in further detail.

A housing cover 260 may be coupled to an upper portion of the housing 252. Also, a spring 266 may be provided between the housing cover 260 and the pressing flange 263 of the valve guide 262. The spring 266 may cause the valve guide 262, valve 264, and guide 258 to move upward when the external force on the nozzle 140 is removed.

The valve 264 can be located at the highest position in the pump 250, and the first protrusion 150 of the nozzle 140 can be inserted into the open upper end of the valve 264. Thus, the content suctioned through the pump 250 can be discharged to the outside through the first channel 146 connected with the first protrusion 150.

On the outer perimeter of the upper end of the valve 264, there may be formed a valve flange 265 that protrudes outward. The valve flange 265 may be separated by a particular gap from the pressing flange 263, and the guide top surface 201 of the adjustment member 200 may be inserted in this gap. Thus, as illustrated in FIG. 2, the valve flange 265 can be exposed above the guide top surface 201, while the pressing flange 263 can be positioned below the guide top surface 201 so as to be pressed downward by the pressure protrusion 204.

From the state shown in FIG. 2, if the adjustment member 200 is rotated due to a rotation of the handle 160, the valve 264 may not move down because of the valve flange 265 caught on the guide top surface 201, and only the valve guide 262 may move down as the pressing flange 263 is pressed down by the pressure protrusion 204. In this way, the downward movement of the valve guide 262 may cause a gap to be formed in the vertical direction between the valve 264 and the valve guide 262, and the amount dispensed by the pump 250 when the nozzle 140 is pressed may be decreased in proportion to this gap. That is, since the valve guide 262 has been pressed and moved down by the adjustment member 200 (whereas the piston 256 has not moved down), the distance from the piston 256 has been decreased. In this state, when the pressing down on the nozzle 140 causes the valve guide 262 to be pressed further down, the valve guide 262 may press and move the piston 256 down sooner. As a result, the suction hole 259 formed in the guide 258 may be closed by the piston 256 sooner, and the amount of content suctioned may be decreased.

Although the above describes a cosmetic container 100 based on this embodiment as having two inner containers 110 coupled and correspondingly including two pumps 250, 270, the present invention is not limited by the number of inner containers 110. Thus, a cosmetic container based on another embodiment of the invention can have one inner container 100 coupled or three or more inner containers 100 coupled.

Although the above describes a cosmetic container 100 based on this embodiment as having a circular outer container 220 and correspondingly having inner containers 110 with semicircular cross sections, the present invention is not limited by the cross-sectional shapes of the outer container and inner containers. Thus, in a cosmetic container based on another embodiment of the invention, the outer container and inner containers can have cross sections of various shapes such as rectangular or elliptical shapes.

While the foregoing provides a description with reference to an embodiment of the invention, it should be appreciated that a person having ordinary skill in the relevant field of art would be able to make various modifications and alterations to the invention without departing from the spirit and scope of the invention set forth in the scope of claims below.

What is claimed is:

1. A cosmetic container comprising:
   an outer container holding a content;
   a handle rotatably coupled to an upper portion of the outer container;
   an adjustment member coupled to an upper portion of the handle to rotate as an integrated body with the handle, the adjustment member being provided with a downwardly protruding pressure protrusion; and
   a pump configured to suction and dispense the content held in the outer container, the pump being configured such that a pressing on a portion thereof by the pressure protrusion changes an amount of content dispensed,
   wherein a rotating of the adjustment member adjusts a discharging amount of the pump by adjusting an extent to which the pressure protrusion presses the pump,
   wherein the adjustment member is provided with a guide hole through which the pump can move, and the pressure protrusion is formed continuously at a lower portion of an inner perimeter of the guide hole,
   wherein the pressure protrusion is formed with a greatest length at one end of the guide hole, and the pressure protrusion is not formed at an opposite end of the guide hole.

2. The cosmetic container of claim 1, wherein two guide holes are formed symmetrically to each other, and the pressure protrusion is formed with left-right symmetry.

3. The cosmetic container of claim 1, wherein the guide hole intersects a line passing through a center of rotation of the adjustment member at two points, and the pressure protrusion has the same length at the two points.

4. The cosmetic container of claim 1, wherein a shoulder is coupled to an upper portion of the outer container, the handle is rotatably coupled to an upper portion of the shoulder,
   a nozzle is coupled to an upper portion of the adjustment member, and the nozzle is connected with the pump to provide a channel for dispensing the content.

5. The cosmetic container of claim 4, wherein shoulder detent indentations are formed in an outer perimeter of the shoulder,
   an indicator protrusion is formed on an inner perimeter of the handle, the indicator protrusion configured to be insertable into the shoulder detent indentations, and
   the shoulder detent indentations are formed in a multiple number to indicate a discharging amount of the pump.

6. The cosmetic container of claim 1, wherein the pump is provided with a pressing flange and a valve flange, the valve flange is configured to be downwardly pressed by the pressure protrusion, and the valve flange is configured to be caught on a guide top surface of the adjustment member.

7. The cosmetic container of claim 1, further comprising an inner container separably coupled within the outer container,
   wherein the content is filled in an inside of the inner container, and an opening of the inner container is connected to the pump when the inner container is coupled to the outer container.

8. The cosmetic container of claim 7, wherein a deep tube holder is coupled to the inner container, and the pump is configured to be insertable into the deep tube holder.

9. The cosmetic container of claim 7, wherein a partition wall is formed within the outer container, and a plurality of inner containers are coupled within interior spaces divided by the partition wall.

10. The cosmetic container of claim 1, wherein two pumps are coupled to the outer container, and
    rotating the adjustment member increases a dispensing amount of one pump and decreases a dispensing amount of another pump.

11. A cosmetic container comprising:
    an outer container holding a content;
    a handle rotatably coupled to an upper portion of the outer container;
    an adjustment member coupled to an upper portion of the handle to rotate as an integrated body with the handle, the adjustment member being provided with a downwardly protruding pressure protrusion; and
    a pump configured to suction and dispense the content held in the outer container, the pump being configured such that a pressing on a portion thereof by the pressure protrusion changes an amount of content dispensed,
    wherein a rotating of the adjustment member adjusts a discharging amount of the pump by adjusting an extent to which the pressure protrusion presses the pump,
    wherein the pump is provided with a pressing flange and a valve flange, the valve flange is configured to be downwardly pressed by the pressure protrusion, and the valve flange is configured to be caught on a guide top surface of the adjustment member.

12. A cosmetic container comprising:
    an outer container holding a content;
    a handle rotatably coupled to an upper portion of the outer container;
    an adjustment member coupled to an upper portion of the handle to rotate as an integrated body with the handle, the adjustment member being provided with a downwardly protruding pressure protrusion;
    a pump configured to suction and dispense the content held in the outer container, the pump being configured such that a pressing on a portion thereof by the pressure protrusion changes an amount of content dispensed; and an inner container separably coupled within the outer container, wherein a rotating of the adjustment member adjusts a discharging amount of the pump by adjusting an extent to which the pressure protrusion presses the pump, wherein the content is filled in an inside of the inner container, and an opening of the inner container is connected to the pump when the inner container is coupled to the outer container, wherein a deep tube holder is coupled to the inner container, and the pump is configured to be insertable into the deep tube holder.

* * * * *